US008923117B2

United States Patent
Rácz et al.

(10) Patent No.: US 8,923,117 B2
(45) Date of Patent: Dec. 30, 2014

(54) CONGESTION HANDLING IN A BASE STATION OF A MOBILE NETWORK (75) Inventors: Sándor Rácz, Cegléd (HU); László Hévizi, Piliscsaba (HU); Szabolcs Malomsoky, Szentendre (HU); Szilveszter Nádas, Budapest (HU); András Veres, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/349,357

(22) PCT Filed: Oct. 4, 2011

(86) PCT No.: PCT/EP2011/067301
§ 371 (c)(1),
(2), (4) Date: Apr. 3, 2014

(87) PCT Pub. No.: WO2013/050062
PCT Pub. Date: Apr. 11, 2013

(65) Prior Publication Data
US 2014/0254381 A1 Sep. 11, 2014

(51) Int. Cl.
*H04W 4/00* (2009.01)
(Continued)

(52) U.S. Cl.
CPC .......... *H04W 72/1252* (2013.01); *H04W 24/08* (2013.01); *H04W 88/08* (2013.01); *H04W 28/0257* (2013.01)
USPC .......................................... 370/229; 370/252

(58) Field of Classification Search
None
See application file for complete search history.

(56) References Cited

U.S. PATENT DOCUMENTS

2004/0170179 A1 9/2004 Johansson et al.
2009/0067335 A1* 3/2009 Pelletier et al. ............... 370/238
(Continued)

FOREIGN PATENT DOCUMENTS

WO 2008066428 A1 6/2008
WO 2008066429 A1 6/2008
WO 2011120581 A1 10/2011

OTHER PUBLICATIONS

Nádas, S. et al., "HSPA Transport Network Layer Congestion Control", HSDPA/HSUPA Handbook, Oct. 25, 2010, pp. 297-330, retrieved on Apr. 2, 2014, CRC Press, retrieved from Internet: http://www.crcnetbase.com/doi/abs/10.1201/b10268-10.

(Continued)

*Primary Examiner* — Chi H Pham
*Assistant Examiner* — Soon-Dong D Hyun
(74) *Attorney, Agent, or Firm* — Coats and Bennett, PLLC (57) ABSTRACT

For implementing handling of congestions in a mobile network, a base station (100), e.g., an evolved Node B, is provided with at least one congestion controller (400, 400'). The congestion controller (400, 400') operates in relation to data packets which are received from a transport network. The base station (100) then transmits the data packets on at least one radio link, which may be accomplished by using one or more scheduling queues (402) and a radio interface scheduler (410). A bitrate detector (404) measures a bitrate of the received data packets, and a bitrate limit calculator (408) calculates, on the basis of the measured bitrate, a maximum bitrate for transmission of the data packets on the radio link. A congestion detector (406) is used to detect a congestion in the transport network. In response to the detected congestion, the radio interface scheduler (410) schedules transmissions on the at least one radio link to meet the calculated maximum bitrate.

17 Claims, 6 Drawing Sheets

(51) Int. Cl.
*H04W 28/10* (2009.01)
*H04W 72/12* (2009.01)
*H04W 24/08* (2009.01)
*H04W 28/02* (2009.01)
*H04W 88/08* (2009.01)

(56) References Cited

U.S. PATENT DOCUMENTS

| | | | |
|---|---|---|---|
| 2010/0195521 A1* | 8/2010 | Wanstedt et al. | 370/252 |
| 2010/0296485 A1* | 11/2010 | Kobori | 370/331 |
| 2011/0176422 A1 | 7/2011 | Nadas et al. | |
| 2012/0014251 A1* | 1/2012 | Arnott et al. | 370/232 |
| 2012/0087244 A1* | 4/2012 | Leung | 370/236 |
| 2012/0147750 A1* | 6/2012 | Pelletier et al. | 370/235 |

OTHER PUBLICATIONS

3rd Generation Partnership Project, "3rd Generation Partnership Project; Technical Specification Group Radio Access Network; Iub/Iur congestion control (Release 7)", 3GPP TR 25.902 V 7.1.0, Mar. 1, 2007, pp. 1-14, 3GPP, France.

* cited by examiner

CONGESTION HANDLING IN A BASE STATION OF A MOBILE NETWORK

TECHNICAL FIELD

The present invention relates to techniques of handling congestions in a mobile network.

BACKGROUND

In 3GPP (Third Generation Partnership Project) mobile networks, e.g., using the Universal Mobile Telecommunications System (UMTS) radio access technology or the 3GPP Long Term Evolution (LTE) radio access technology, intermediate transport networks may be used to convey data between different nodes of the mobile network, in particular between nodes of a Radio Access Network (RAN).

Such an intermediate transport network may be a potential bottleneck with respect to data traffic to or from a user equipment (UE). For example, when transmitting downlink (DL) data traffic to a UE, a congestion may occur in the transport network and slow down or even completely block the DL traffic to the UE. Also, if the RAN is limited by a transport network bottleneck, fairness among different UEs may become an issue because some one UE may be affected by the congestion more severely than another.

Further, problems may also arise when different radio access technologies coexist in the mobile network. In such cases, for example an UMTS base station, also referred to as "Node B" (NB) may share the same transport network with an LTE base station, also referred to as "evolved Node B" (eNB). In this case, different mechanisms for congestion handling may be applied by the different radio access technologies, which may cause problems concerning fairness among the different radio access technologies.

Accordingly, there is a need for techniques which allow for efficient handling of congestions which may occur in a transport network used for transmitting data packets to a base station of a mobile network.

SUMMARY

According to an embodiment of the invention, a method of congestion handling in a mobile network is provided. According to the method, a base station receives data packets from a transport network. The base station then transmits the data packets on at least one radio link. Further, the base station measures a bitrate of the received data packets and calculates, on the basis of the measured bitrate, a maximum bitrate for said transmitting of the data packets on the radio link. The base station also detects a congestion in the transport network. In response to the detected congestion, the base station schedules transmissions on the at least one radio link to meet the maximum bitrate.

According to a further embodiment of the invention, a base station is provided. The base station comprises a first interface for receiving data packets from a transport network, a second interface for transmitting the received data packets on at least one radio link, and a processor. The processor is configured to:
  measure a bitrate of the received data packets,
  calculate, on the basis of the measured bitrate, a maximum bitrate for said transmitting of the data packets on the at least one radio link,
  detect a congestion in the transport network, and
  in response to the detected congestion, schedule transmissions on the at least one radio link to meet the maximum bitrate.

According to a further embodiment of the invention, a computer program product is provided, e.g., in the form of a storage medium. The computer program product comprises program code to be executed by a processor of a base station. By executing the program code the base station is configured to:
  measure a bitrate of the received data packets,
  calculate, on the basis of the measured bitrate, a maximum bitrate for said transmitting of the data packets on the at least one radio link,
  detect a congestion in the transport network, and
  in response to the detected congestion, schedule transmissions on the at least one radio link to meet the maximum bitrate.

According to further embodiments, other methods or devices may be provided.

DETAILED DESCRIPTION OF EMBODIMENTS

In the following, the invention will be explained in more detail by referring to exemplary embodiments and to the accompanying drawings. The illustrated embodiments relate to congestion handling in a mobile network, e.g., a 3GPP mobile network in which an LTE base station coexists with a UMTS base station, and are implemented within one of the base stations. Specifically, the concepts may be applied within an eNB which shares a RAN transport network with a NB, e.g., a NB implementing High Speed Packet Access (HSPA). However, it is to be understood that the concepts as described herein may also be applied in other types of mobile networks.

Figure 1:
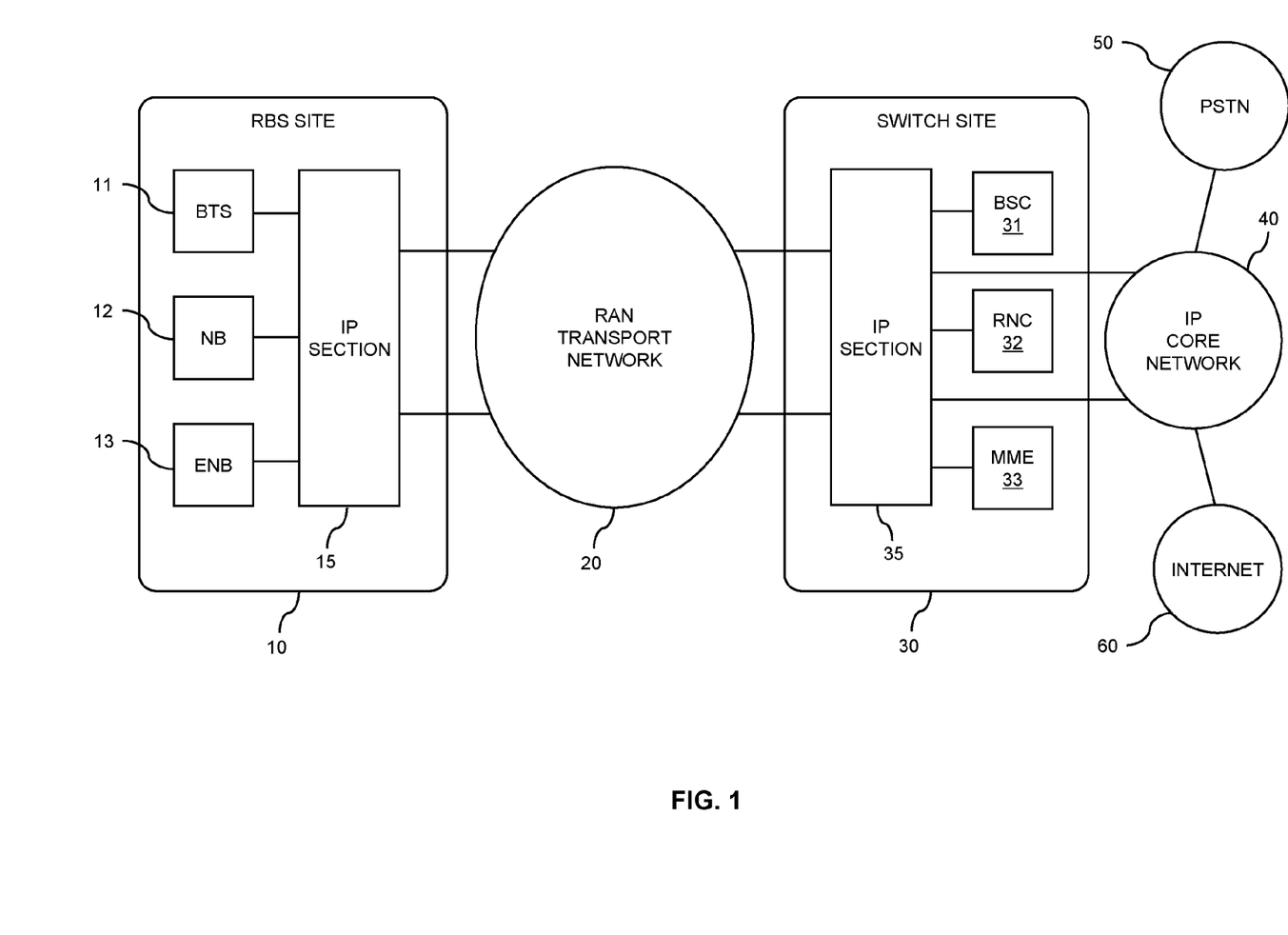
FIG. 1 schematically illustrates a mobile network environment in which concepts of congestion handling according to an embodiment of the invention may be applied.

FIG. 1 schematically illustrates a mobile network environment in which a RAN comprises a radio base station (RBS) site 10, a switch site 30, and a transport network 20 connecting the RBS site 10 and the switch site 30.

As illustrated, the RBS site 10 may comprise different types of base stations 11, 12, 13 in order to support different types of radio access technology in the mobile network. In the illustrated example, the base stations 11, 12, 13 include a Base Transceiver Station (BTS) 11 supporting Global System for Mobile Communications (GSM) radio access technology, a NB 12 supporting UMTS radio access technology, and an eNB 13 supporting LTE radio access technology. The switch site 30, which has the purpose of coupling the RAN to a Public Switched Telephone Network (PSTN) 50 and the internet 60, which is accomplished via an Internet Protocol (IP) core network 40. Further, the RBS site 10 includes an IP section 15 which has the purpose of coupling the RBS site 10 to the switch site 30, which is accomplished via the transport network 20. In accordance with the radio access technologies implemented at the RBS site, the switch site 30 comprises different types of control nodes, in particular a Base Station Controller (BSC) 31 for controlling the BTS 11, a Radio Network Controller (RNC) 32 for controlling the NB 12, and a MME 33 for controlling the eNB 13. Further, the switch site 30 includes an IP section 35 which has the purpose of coupling the switch site 30 to the RBS site 10, which is accomplished via the transport network 20.

The IP section 15 of the RBS site 10 and the IP section of the switch site 30 may implement various functionalities for coupling the RBS site 10 and the switch site 30 to each other. For example, the IP sections 15, 35 may implement suitable logical interfaces. For example, the IP sections may implement the Iub interface of the UMTS radio access technology and the S1 interface of the LTE radio access technology. Further, the IP sections 15, 35 may implement Ethernet switching, IP routing, and/or IP security mechanisms.

The transport network 20 may be based on various types of network technologies, such as electrical wire, optical fibre, radio transmission, microwave transmission, or the like, and may be organized, e.g., as a Metropolitan Area Network (MAN), a Wide Area Network (WAN), a Local Area Network (LAN), or the like. The transport network 20 is based on IP packet transmission in connection with the Transport Control Protocol (TCP).

As can be seen, in the mobile network environment of FIG. 1, the transport network 20 may be shared in multiple ways. For example, the transport network 20 may be shared by multiple UEs connected to one of the base stations 11, 12, 13. Further, the transport network 20 may be shared by multiple base stations, e.g., by the NB 12 and by the eNB 13. This sharing may result in congestions in the transport network 20. Accordingly, it is desirable to implement the mobile network with a congestion handling mechanism which allows for efficiently and fairly handling such congestions. Concepts as described in the following specifically relate to a congestion handling mechanism implemented in the eNB 13, which allows for achieving fairness among different UEs connected to the eNB 13, but may also be used for achieving fairness among a UE connected to the eNB 13 and a UE connected to the NB 12.

According to embodiments of the invention as explained in the following, the eNB 13 is provided with a rate-based congestion control algorithm. Any rate-based control algorithm may be used, e.g., an Additive Increase/Multiplicative Decrease (AIMD) algorithm. The latter example of rate based congestion control algorithm may in particular be used to improve compatibility to congestion control mechanisms as used in the NB 12.

The rate-based congestion control algorithm used in the eNB 13 is based on congestion detection, bitrate calculation, and rate shaping. The congestion detection can for example be based on detecting an Explicit Congestion Notification (ECN) as defined in the TCP, or on detecting a packet loss. The bitrate calculation involves calculating a maximum bitrate for transmission of DL data packets on a radio link established from the eNB 13 to a UE. The maximum bitrate is calculated on the basis of a measured bitrate at which the eNB 13 receives the DL data packets from the transport network 20. This measured bitrate represents the conditions of the transport network 20 and may vary depending on the load of the transport network 20. If a congestion in the transport network 20 is detected, the maximum bitrate may be reduced to resolve the congestion. The eNB 13 further schedules transmissions on the radio link in response to the detected congestion in order to implement rate shaping. That is to say, scheduling of the transmissions is accomplished in such a way that the calculated maximum bitrate is met, i.e., not exceeded. If there is no congestion in the transport network 20, rate shaping is not necessary. This rate shaping can be implemented as an additional functionality of an existing radio interface scheduler of the eNB 13.

The congestion control algorithm may be implemented on a per-bearer basis. That is to say, congestion detection, bitrate calculation, and rate shaping may be accomplished individually for each bearer established on the radio link. In this respect, a bearer is considered to be an information transmission context or path of defined characteristics, e.g., capacity, delay, and/or bit error rate. If the radio link uses both guaranteed bitrate (GBR) bearers and non-guaranteed bitrate (non-GBR) bearers, the congestion control algorithm may be applied with respect to only the non-GBR bearers in order to avoid adversely affecting the GBR bearers. As an alternative, the congestion control algorithm may also be implemented on a per-user level. In this case, congestion detection, bitrate calculation, and rate shaping may be accomplished individually for each connected UE. In this case, all non-GBR bearers on the radio link to a certain UE could be controlled using a common parameter, e.g., by using concepts as defined in Section 4.7.3 of GPP Technical Specification 23.401.

Figure 2:
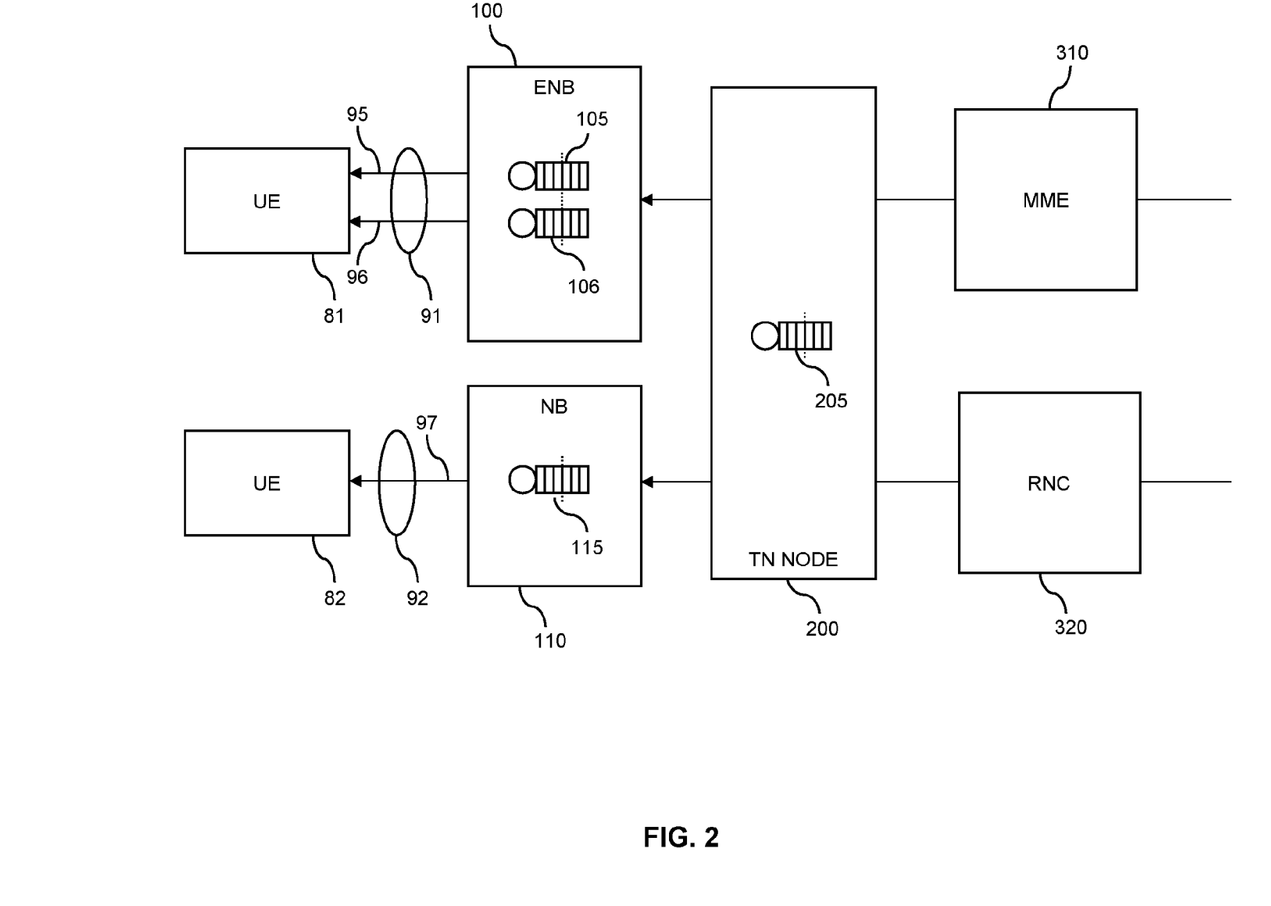
FIG. 2 schematically an exemplary traffic scenario in a mobile network, to which concepts of congestion handling according to an embodiment of the invention may be applied.

FIG. 2 shows an exemplary scenario in which congestion handling according to the above concepts is applied on a per-bearer basis. More specifically, FIG. 2 illustrates an eNB 100, e.g., corresponding to the eNB 13 of FIG. 1, and a NB 110, e.g., corresponding to the NB 12 of FIG. 1. The eNB 100 is connected to a MME 310, and the NB 110 is connected to an RNC 320. For this purpose, the eNB 100 and the NB 110 share the same transport network, represented by a transport network (TN) node 200. The TN node 200 of FIG. 2 may for example be part of the transport network 20 of FIG. 1. Here, it is to be understood that the transport network may actually include further transport nodes, which are not shown in FIG. 2.

As further illustrated, the eNB 100 is connected to a UE 81 via a radio link 91. On the radio link 91, two bearers 95 and 96 are established. In the following, it will be assumed that the bearers 95 and 96 are non-GBR bearers. The NB 110 is connected to a UE 82 via a radio link 92. In the illustrated example, a single bearer 97 is established on the radio link 92, which is assumed to be a non-GBR bearer as well.

As can be seen in FIG. 2, the eNB 100 provides a queue 105 for buffering DL data packets to be transmitted on the bearer 95 and a queue 106 for buffering DL data packets to be transmitted on the bearer 96. The eNB 100 receives these DL data packets from the TN node 200, where the DL data packets are buffered in queue 205. The NB 110 provides a queue 115 for buffering DL data packets to be transmitted on bearer 97. The NB 110 receives these DL data packets from the TN node 200, where the DL data packets are buffered in queue 205. Accordingly, the eNB 100 and the NB provide a corresponding queue 105, 106, 115 for each of the bearers 95, 96, 97. From these queues 105, 106, 115, the DL data packets are transmitted on the corresponding radio links 91, 92 to the UEs 81, 82. However, in the TN node 200, the queue 205 is shared for all bearers 95, 96, 97, which may result in a congestion.

By means of the above-mentioned rate-based control algorithm, the eNB 100 can detect a congestion in the TN node 200 or in some other part of the transport network, e.g., by detecting a packet loss, i.e., a missing DL data packet in one of the queues 105, 106, or by detecting an ECN in one of the DL data packets received from the TN node 200. The eNB 100 can then reduce the maximum bitrate calculated on the basis of the DL data packets received from the TN node 200 and invoke the rate shaping by controlling scheduling of transmission of the DL data packets from the queues 105, 106. In this way, the congestion in the transport network may be resolved by throttling the DL data traffic from the eNB 100 to the UE 81, which in turn decreases the bitrate of DL and traffic generated in response thereto, e.g., due to the effect of delayed acknowledgements from the UE 81. The congestion handling algorithm implemented by the NB 110 will react in a similar manner to the congestion, which means that the UE 81 and the UE 82 will be treated fairly. Here, it should also be noted that the implementation of the congestion handling algorithm on a per-bearer level means that rate shaping will typically be invoked for both of the bearers 95, 96 in a similar manner, although both bearers 95, 96 may have different maximum bitrates. This in turn means that the congestion handling algorithm will not prefer the eNB 100 over the NB 110, although the eNB 100 uses two bearers 95, 96 on the radio link 91 to the UE 81 while the NB 100 uses only one bearer 97 on the radio link 92 to the UE 82.

Figure 3:
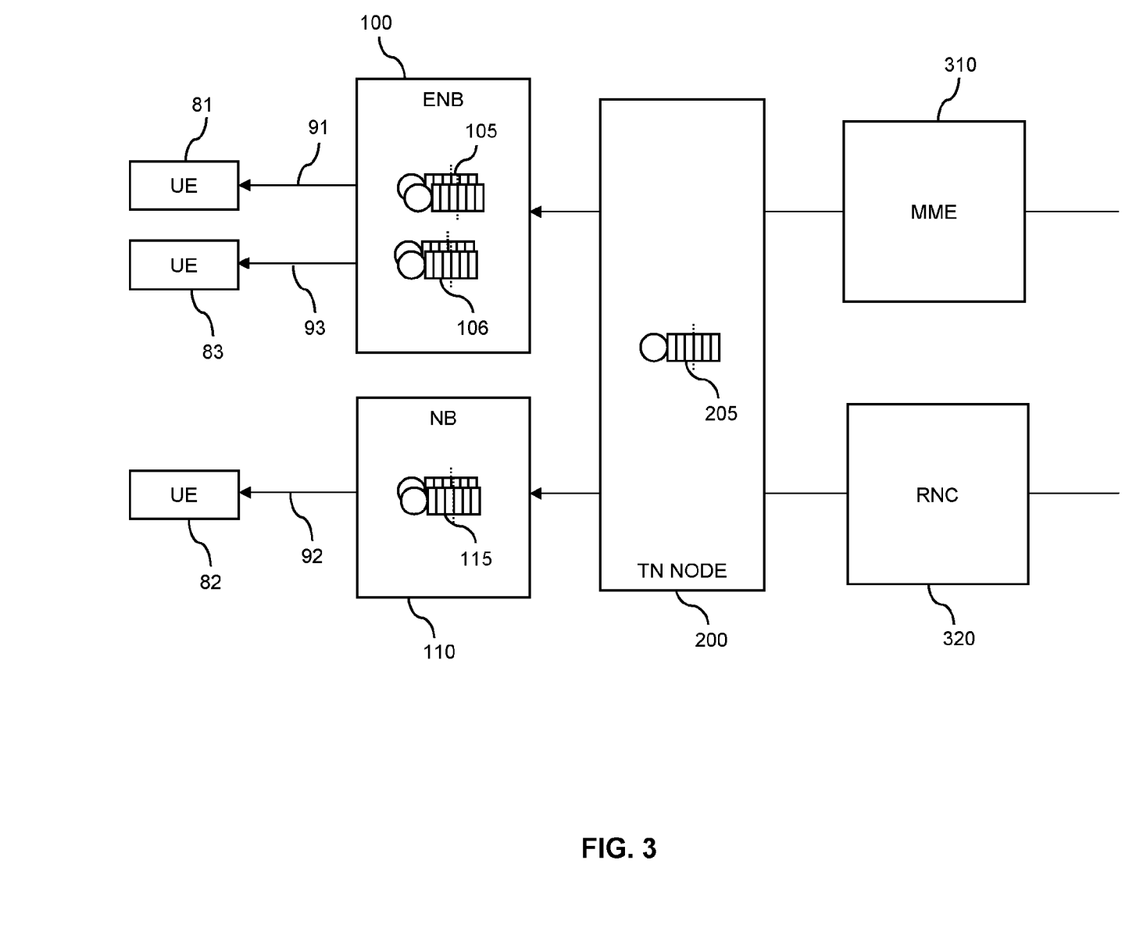
FIG. 3 schematically a further exemplary traffic scenario in a mobile network, to which concepts of congestion handling according to an embodiment of the invention may be applied.

FIG. 3 shows a further exemplary scenario in which congestion handling according to the above concepts is applied on a per-user basis. FIG. 3 illustrates similar components as FIG. 2. However, in this case two UEs 81, 83 are connected to the eNB 100. In particular, the UE 81 is connected to the eNB 100 via radio link 91, and the UE 83 is connected to the eNB 100 via radio link 93. As in FIG. 2, the UE 82 is connected to the NB 110 via radio link 92. In the scenario of FIG. 3 it is assumed that on each of the radio links one or more bearers are established, e.g., non-GBR bearers, which may be controlled together by setting aggregate Quality of Service parameters, such as Aggregate Maximum Bitrate (AMBR) per UE.

As can be seen in FIG. 3, the eNB 100 provides respective queues 105 for buffering DL data packets to be transmitted on the bearers of the radio link 91 and respective queues 106 for buffering DL data packets to be transmitted on the bearers of the radio link 93. The eNB 100 receives these DL data packets from the TN node 200, where the DL data packets are buffered in queue 205. The NB 110 provides respective queues 115 for buffering DL data packets to be transmitted on bearers of the radio link 92. The NB 110 receives these DL data packets from the TN node 200, where the DL data packets are buffered in queue 205. Accordingly, the eNB 100 and the NB 110 provide a corresponding queue 105, 106, 115 for each of the bearers on the radio links 91, 92, 93. From these queues 105, 106, 115, the DL data packets are transmitted on the corresponding radio links 91, 92 to the UEs 81, 82, 83. However, in the TN node 200, the queue 205 is shared for all bearers which may result in a congestion.

By means of the above-mentioned rate-based control algorithm, the eNB 100 can detect a congestion in the TN node 200 or in some other part of the transport network, e.g., by detecting a packet loss, i.e., a missing DL data packet in one of the queues 105, 106, or by detecting an ECN in one of the DL data packets received from the TN node 200. The eNB can then reduce the maximum bitrate calculated on the basis of the DL data packets received from the TN node 200 and invoke the rate shaping by controlling scheduling of transmission of the DL data packets from the queues 105, 106. However, in the scenario of FIG. 3, the maximum bitrate is calculated per UE, i.e., on the basis of the sum of the measured bitrates of the bearers on the radio link 91 and on the basis of the sum of the measured bitrates of the bearers on the radio link 93. The rate shaping is then accomplished to meet the maximum bitrates as calculated per UE. In this way, the congestion in the transport network may be resolved by throttling the DL data traffic from the eNB 100 to the UE 81, which in turn decreases the bitrate of DL and traffic generated in response thereto, e.g., due to the effect of delayed acknowledgements from the UEs 81, 83. The congestion handling algorithm implemented by the NB 110 will react in a similar manner to the congestion, which means that the UEs 81, 83 and the UE 82 will be treated fairly. Here, it should also be noted that the implementation of the congestion handling algorithm on a per-user basis means that rate shaping will typically be invoked for all non-GBR bearers on the radio links 91, 93 in a similar manner, although there may be different maximum bitrates for each of the UEs. This in turn means that the congestion handling algorithm in the eNB 100 will not prefer the UE 81 over the UE 83 or vice versa, although the bearer configurations on the radio links 91, 93 may differ from each other.

Figure 4:
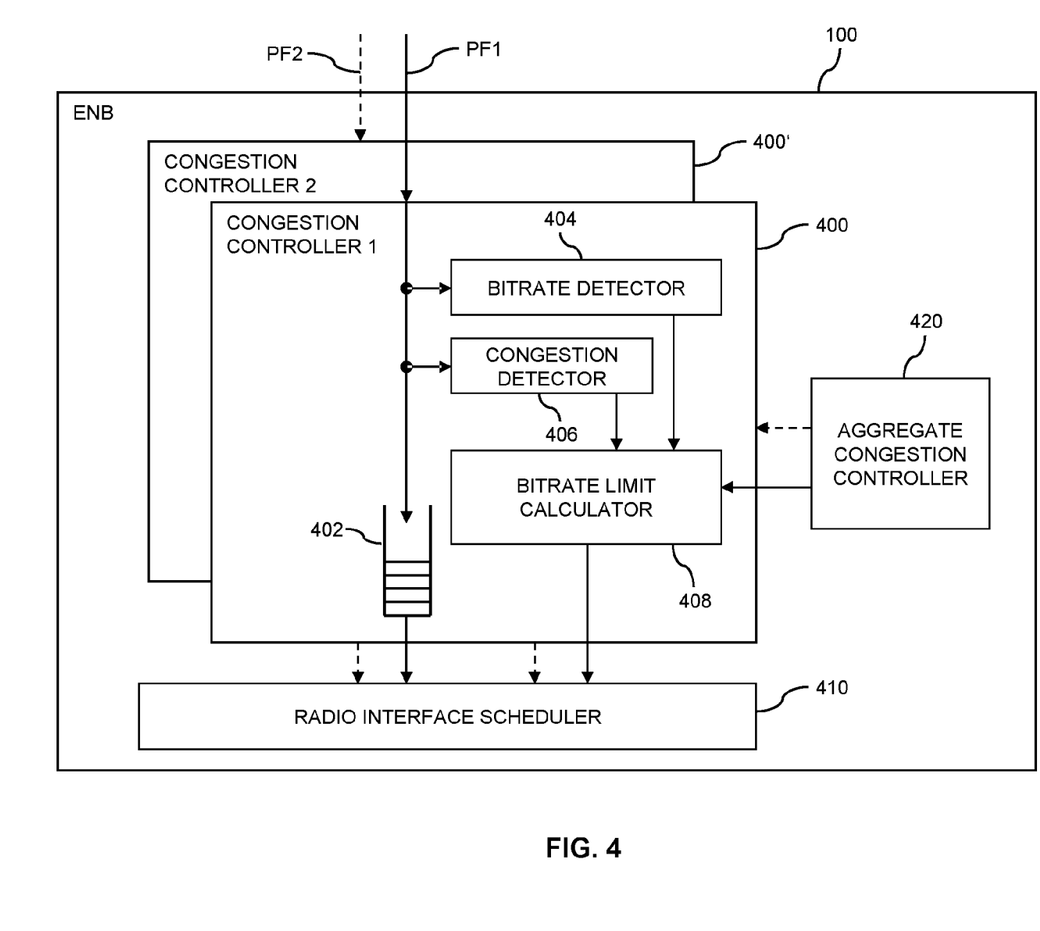
FIG. 4 schematically illustrates a base station according to an embodiment of the invention.

FIG. 4 schematically illustrates structures of the eNB 100 for implementing the above congestion handling algorithm. In the illustrated example, implementation of congestion handling on a per-bearer basis is assumed. However, as will be further explained below, these structures may be adapted to alternatively or additionally implement congestion handling on a per-user basis.

As illustrated, the eNB 100 includes a congestion controller 400, 400' for each bearer established to one or more UEs. In the example of FIG. 4, a first congestion controller 400 receives a first packet flow PF1 of DL data packets, and a second congestion controller 400' receives a second packet flow PF2 of DL data packets. As explained above, the DL packets of the packet flows PF1, PF2 are received from the transport network and may therefore have been transferred through the same queue, e.g., through queue 205 of TN node 200 as explained in connection with FIGS. 2 and 3. As used herein, a packet flow is a sequence of data packets transmitted between a certain source and a certain destination. In the case of IP data packets, the destination can be identified on the basis of a destination IP address and a destination port number in the data packets, and the source can be identified by a source IP address and a source port number in the data packets. Further, a packet flow can be identified on the basis of a protocol identifier provided in the data packets. The destination IP address, the source IP address, the destination port number, the source port number, and the protocol identifier of IP packets are also referred to as IP 5-tuple.

Each of the congestion controllers 400, 400' operates with respect to a corresponding scheduling queue 402 to which the DL data packets of the packet flow PF1, PF2 are mapped. These scheduling queues 402 may correspond to the queues 105, 106 of FIGS. 2 and 3. The mapping of packet flows to the scheduling queues 402 may for example be implemented by packet filters installed in the eNB 100. Further, each of the congestion controllers includes a bitrate detector 404, a congestion detector 406, and a bitrate limit calculator 408.

Further, the eNB 100 includes a radio interface scheduler 410 which receives input signals from each of the congestion controllers 400, 400', in particular from the respective bitrate limit calculators 406. The radio interface scheduler 410 schedules the DL data packets from the different scheduling queues 402, which is accomplished on the basis of the input signals from the bitrate limit calculators 408.

The bitrate detector 404 measures a bitrate of the incoming DL data packets of the corresponding packet flow PF1, PF2, e.g., by counting the number of received bits. The congestion detector 406 detects congestions in the transport network, which may be accomplished by monitoring the incoming DL data packets of the corresponding packet flow for a packet loss or an ECN. The congestion detector 406 may also operate on the basis of information provided by the bitrate detector 404, e.g., a drop of measured bitrate. The bitrate limit calculator 408 calculates a maximum bitrate on the basis of the bitrate as measured by the bitrate detector 404. Various algorithms may be used for this purpose. Typically, the maximum bitrate as calulated by the bitrate limit calculator 408 will decrease as the measured bitrate decreases. For example, the bitrate limit calculator 408 may use an AIMD algorithm to calculate the maximum bitrate. In order to improve compatibility to congestion handling in a coexisting NB implementing HSPA, e.g., the NB 12 of FIG. 1 or the NB 110 of FIGS. 2 and 3, the AIMD algorithm may be selected to be similar as that used in HSPA, e.g., from the same algorithm family.

The radio interface scheduler 410 uses the maximum bitrates as determined by the maximum bitrate calculators as basis for controlling scheduling of transmissions of the DL data packets from the queues 402. In particular, if the congestion detector 404 in one or more of the congestion detectors indicates a congestion, the radio interface scheduler 410 may control the scheduling in such a way that the calculated maximum bitrates are met, i.e., by performing rate shaping to the calculated maximum bitrates. This may be achieved by delaying the transmission of DL data packets from one or more scheduling queues 402. By means of the rate shaping, the distribution of resource usage in the transport network can be made similar to the resource sharing on the radio interface, thereby also achieving similar fairness among different users.

Optionally, the eNB 100 may also be provided with an aggregate congestion controller 420. As illustrated, the aggregate congestion controller 420 may provide additional inputs to the individual congestion controllers 400, 400', in particular to the bitrate limit calculators 408. By means of the aggregate congestion controller 420, information aggregated on the level of the eNB 100 can be additionally used when calculating the maximum bitrate. Examples of such information are a number of packet flows PF1, PF2 transmitted through the eNB 100 an average of the calculated maximum bitrate of the packet flows PF1, PF2 for which a congestion was detected, or parameters as applied by the radio interface scheduler 410 when scheduling the transmission of the DL data packets from the scheduling queues 402. scheduling information. The aggregated information may for example be useful at start-up of communication on a certain bearer, when individual measurements as performed by the bitrate detector 404 are not yet available.

The structures of FIG. 4 may be adapted to alternatively or additionally implement the congestion handling on a per-user basis by assigning each congestion controller to multiple scheduling queues 402 corresponding to a specific UE. In this case, the bitrate detector 404 would measure the sum of bitrates of these scheduling queues 402, the congestion detector 406 would monitor DL data packets of each packet flow assigned to these scheduling queues 402, and the bitrate limit calculator 408 would calculate an aggregate maximum bitrate for these queues 402.

Figure 5:
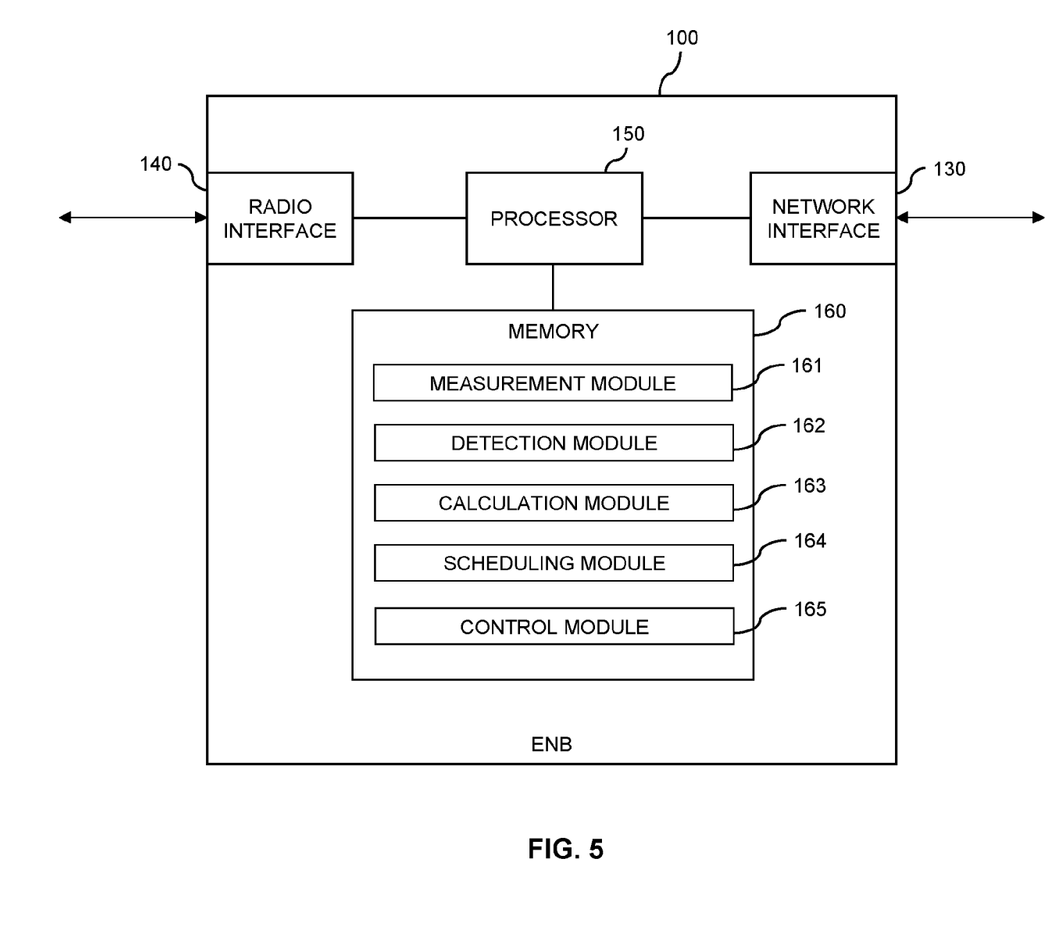
FIG. 5 schematically illustrates a processor-based implementation of a base station according to an embodiment of the invention.

FIG. 5 illustrates a processor-based implementation of the eNB 100.

As illustrated, the eNB 100 includes a network interface 130 and a radio interface 140. The network interface may be used for receiving DL data packets from a packet core network, e.g., from the IP core network 40 of FIG. 1, which is accomplished via an intermediate transport network, e.g., the RAN transport network 20 of FIG. 1. The network interface 130 may be implemented as the Iub interface according to 3GPP LTE. The radio interface 140 may be used for establishing a radio links to UEs. Typically, these UEs will be served by the base station 100, i.e., the base station 100 may act as a controller with respect to the data traffic to or from the UEs. At least one bearer may be established on the radio link to a certain UE. In some scenarios, e.g., as illustrated in FIG. 3, also multiple bearers may be established on the radio link to a certain UE. The radio interface 140 may be implemented as the Uu interface according to 3GPP LTE.

As further illustrated, the eNB 100 includes a processor 150 coupled to the interfaces 130, 140 and a memory 160 coupled to the processor 150. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 150 so as to implement at least some of the above-described congestion handling functionalities of the eNB 100. More specifically, the memory 160 may include a measurement module 161 for implementing the above measurement of bitrates on the basis of DL data packets received via the network interface, a detection module 162 for implementing the detection of congestions in the transport network, a calculation module 163 for implementing the above calculation of maximum bitrates, a scheduling module 164 for implementing the scheduling of transmissions via the radio interface 140, and/or a control module 165 for implementing general control functionalities, such as establishment or configuration of bearers. According to some embodiments, also a computer program product may be provided for implementing concepts according to embodiments of the invention, e.g., in the form of a computer-readable medium storing the program code to be stored in the memory 160.

It is to be understood that the structure as illustrated in FIG. 5 is merely schematic and that the eNB 100 may actually include further components which, for the sake of clarity, have not been illustrated, e.g., additional interfaces. Also, it is to be understood that the memory 150 may include further types of program code modules which have not been illustrated, e.g., program code modules for implementing known functionalities of an eNB.

Figure 6:
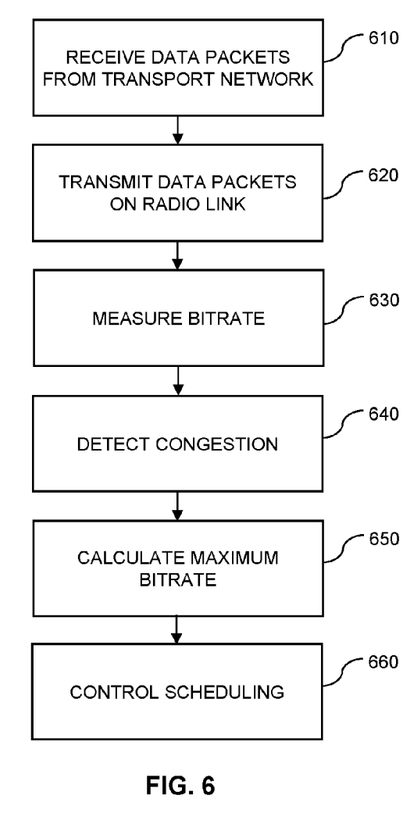
FIG. 6 shows a flowchart for illustrating a method according to an embodiment of the invention.

FIG. 6 shows a flowchart for illustrating a method of congestion handling. The method is implemented in a base station, e.g., in the eNB 13 of FIG. 1 or in the eNB 100 of FIGS. 2 to 5.

At step 610, the base station receives data packets from a transport network, e.g., from the RAN transport network 20 of FIG. 1, which in turn may include one or more transport network nodes, such as the TN node 200 of FIGS. 2 and 3. The transport network may be shared with at least one further base station. For example, the base station may be an eNB, e.g., the eNB 13 of FIG. 1 or the eNB 100 of FIGS. 2 to 5, and the further base station may be an NB, e.g., the NB 12 of FIG. 1 or the NB 110 of FIGS. 2 and 3. The base station may receive the data packets via a corresponding interface, e.g., the network interface 130 of FIG. 5.

At step 620, the base station transmits the data packets on at least one radio link. Typically, this radio link is to a UE served by the base station. In some scenarios, the data packets may also be transmitted on two or more radio links to different UEs, i.e., users. Examples of such radio links are the radio links 91 and 93 of FIGS. 2 and 3. The radio link may comprise one, two or more bearers, e.g., non-GBR bearers, to which the data packets are mapped. If the radio link comprises two or more bearers, such as the radio link 91, the base station may determine to which one of these bearers the data packets are mapped. This may be accomplished on the basis of a packet flow comprising the data packets, e.g., by using filtering of the data packets on the basis of an IP 5-tuple filter or parts thereof, such as destination address, source address, destination port number, source port number, and/or protocol identifier. The base station may transmit the data packets via a corresponding interface, e.g., the radio interface 140 of FIG. 5.

At step 630, the base station measures a bitrate of the received data packets, e.g., by means of the bitrate detector 404 of FIG. 4. The measurement of the bitrate may be accomplished on a per-bearer basis or on a per-user basis. The bitrate may be measured by counting received bits.

At step 640, the base station detects a congestion in the transport network, e.g., by means of the congestion detector 406 of FIG. 4. This may for example be accomplished by monitoring the received data packets for a packets loss or an ECN. The congestion may also be detected by monitoring the bitrate as measured at step 630. For example, a drop of the bitrate may indicate a congestion. The detection of the congestion may be accomplished on a per-bearer basis or on a per-user basis.

At step 650, the base station calculates a maximum bitrate, e.g., by means of the bitrate limit calculator 408 of FIG. 4. This is accomplished on the basis of the bitrate as measured at step 630. Typically, the calculated maximum bitrate decreases as the measured bitrate decreases and/or increases as the measured bitrate increases. Various algorithms may be used to implement this behavior, e.g., an AIMD algorithm. The calculation of the maximum bitrate may also take into account aggregate information, e.g., a number of packet flows transmitted through the base station, an average of the maximum bitrates of bearers for which a congestion is detected, an averages of the maximum bitrates of users for which a congestion is detected, and/or on the basis of scheduling information used for scheduling transmissions on the at least one radio link.

At step 660 the base station controls the scheduling of transmissions on the at least one radio link, e.g., by means of the radio interface scheduler 410 of FIG. 4. In particular, in response to detecting a congestion at step 640, the base station accomplishes the scheduling in such a way that the maximum bitrate as calculated at step 650 is met. Accordingly, the maximum bitrate calculated at step 650 may define an upper bitrate limit. This specifically means that actual bitrates in excess of the calculated maximum bitrate are avoided. In other words, in response to detecting the congestion at step 640, the base station performs rate shaping to the calculated bitrate of step 650. This may for example be accomplished by delaying the transmission of the data packets.

As can be seen, the concepts as explained herein allow for providing a relatively simple way of handling congestions. In particular, the described congestion handling mechanism can be implemented only in the base station, in particular only in the eNB, without relying on support from other network nodes such as in the transport network. Further, the congestion handling mechanism can be used to achieve fairness on a per-bearer level and/or on a per-user level. For example, adverse effects arising from single aggressive users with multiple packet flows on multiple bearers can be avoided.

Further, with respect to base stations of other radio access technologies sharing the same transport network can be implemented without requiring direct interaction between the different base stations. For example, in the above eNB based implementation, fairness with respect to the NB can be obtained by using a similar rate-based algorithm such as the AIMD algorithm. In this way, coexistence between different radio access technologies is facilitated, which is beneficial for example when equipping existing UTRANs with additional eNBs so as to introduce LTE without causing excessive on the overall network infrastructure. The possibility of reusing algorithms also facilitates implementation.

It is to be understood that the examples and embodiments as explained above are merely illustrative and susceptible to various modifications. For example, the concepts could be used in other types of mobile network, i.e., in other types of base station. Also, various rate based congestion control algorithms could be used and selected in order to achieve compatibility among different types of base stations sharing the same transport network resources. Further, the implementation of congestion handling on a per-bearer basis could be combined with the implementation of congestion handling on a per-user basis, e.g., by using congestion handling on a per-bearer basis for only some of multiple users and using congestion handling on a per-user basis for the other users.

The invention claimed is:

1. A method of congestion handling in a mobile network, the method comprising:
   a base station receiving data packets from a transport network;
   the base station transmitting the data packets on at least one radio link;
   the base station measuring a bitrate of the data packets received from the transport network;
   the base station calculating, based on the measured bitrate, a maximum bitrate for the transmitting of the data packets on the at least one radio link;
   the base station detecting a congestion in the transport network;
   in response to detecting the congestion, the base station scheduling transmissions on the at least one radio link to not exceed the maximum bitrate.

2. The method of claim 1:
   wherein the radio link comprises at least two bearers to which the data packets are mapped;
   wherein the bitrate is measured per bearer, the congestion is detected per bearer, and the maximum bitrate is calculated per bearer.

3. The method of claim 2, wherein the calculating the maximum bitrate comprises calculating the maximum bitrate based on an average of the maximum bitrates of bearers for which a congestion is detected.

4. The method of claim 2, wherein the base station determines, from a packet flow comprising the data packets, to which one of the bearers the data packets are mapped.

5. The method of claim 1:
   wherein the data packets are comprised in data traffic of at least two users;
   wherein the bitrate is measured per user, the congestion is detected per user, and the maximum bitrate is calculated per user.

6. The method of claim 5, wherein the calculating the maximum bitrate comprises calculating the maximum bitrate based on an average of the maximum bitrates of users for which a congestion is detected.

7. The method of claim 1, wherein the calculating the maximum bitrate comprises calculating the maximum bitrate based on a number of packet flows transmitted by the base station.

8. The method of claim 1, wherein the calculating the maximum bitrate comprises calculating the maximum bitrate based on parameters used in the scheduling of transmissions on the radio link.

9. The method claim 1, wherein the calculating the maximum bitrate comprises calculating the maximum bitrate using an Additive Increase/Multiplicative Decrease algorithm.

10. The method claim 1, wherein the detecting the congestion comprises detecting the congestion based on an Explicit Congestion Notification field in the received data packets.

11. The method of claim 1, wherein the base station is configured as an evolved Node B.

12. The method of claim 11, wherein the transport network is shared with a further base station, the further base station configured as a Node B.

13. The method of claim 12, wherein the calculating the maximum bitrate comprises calculating the maximum bitrate using an Additive Increase/Multiplicative Decrease algorithm belonging to a same family as an Additive Increase/Multiplicative Decrease algorithm of the further base station.

14. A base station, comprising:
   a first interface configured to receive data packets from a transport network;
   a second interface configured to transmit the data packets received from the transport network on at least one radio link;
   a processing circuit configured to:
      measure a bitrate of the data packets received from the transport network;
      calculate, based on the measured bitrate, a maximum bitrate for the transmitting of the data packets on the at least one radio link;
      detect a congestion in the transport network;
      in response to detecting the congestion, schedule transmissions on the at least one radio link to not exceed the maximum bitrate.

15. The base station of claim 14:
   wherein the radio link comprises at least two bearers to which the data packets are mapped;
   wherein the processing circuit is configured to:
      measure a bitrate of the data packets received from the transport network per bearer;
      calculate, per bearer and based on the corresponding measured bitrate, a maximum bitrate for the transmitting of the data packets on the at least one radio link;
      detect a congestion per bearer in the transport network;
      in response to detecting the congestion, schedule transmissions on the at least one radio link to not exceed the maximum bitrate.

16. The base station of claim 14:
   wherein the data packets are comprised in data traffic of at least two users;
   wherein the processing circuit is configured to:
      measure a bitrate of the data packets received from the transport network per user;
      calculate, per user and based on the corresponding measured bitrate, a maximum bitrate for the transmitting of the data packets on the at least one radio link;
      detect a congestion per user in the transport network;
      in response to detecting the congestion, schedule transmissions on the at least one radio link to not exceed the maximum bitrate.

17. A computer program product stored in a non-transitory computer readable medium for handling congestion in a mobile network, the computer program product comprising software instructions which, when run on one or more processors of a base station, causes the base station to:
   receive data packets from a transport network;
   transmit the data packets on at least one radio link;
   measure a bitrate of the data packets received from the transport network;
   calculate, based on the measured bitrate, a maximum bitrate for the transmitting of the data packets on the at least one radio link;
   detect a congestion in the transport network;
   in response to detecting the congestion, schedule transmissions on the at least one radio link to not exceed the maximum bitrate.

* * * * *